(12) United States Patent
Matsushita

(10) Patent No.: US 10,766,113 B2
(45) Date of Patent: Sep. 8, 2020

(54) MACHINE TOOL

(71) Applicant: MAKINO MILLING MACHINE CO., LTD., Tokyo (JP)

(72) Inventor: Sakyo Matsushita, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 209 days.

(21) Appl. No.: 16/060,285

(22) PCT Filed: Dec. 11, 2015

(86) PCT No.: PCT/JP2015/084821
§ 371 (c)(1),
(2) Date: Jun. 7, 2018

(87) PCT Pub. No.: WO2017/098658
PCT Pub. Date: Jun. 15, 2017

(65) Prior Publication Data
US 2018/0354088 A1    Dec. 13, 2018

(51) Int. Cl.
| B23Q 15/12 | (2006.01) |
| B23Q 17/12 | (2006.01) |
| G05B 19/18 | (2006.01) |
| B23Q 11/00 | (2006.01) |
| B23Q 17/09 | (2006.01) |
| G01H 1/06  | (2006.01) |

(Continued)

(52) U.S. Cl.
CPC .......... *B23Q 15/12* (2013.01); *B23Q 11/0032* (2013.01); *B23Q 17/0971* (2013.01); *B23Q 17/12* (2013.01); *G01H 1/003* (2013.01); *G01H 1/06* (2013.01); *G05B 19/18* (2013.01); *G05B 19/406* (2013.01)

(58) Field of Classification Search
CPC combination set(s) only.
See application file for complete search history.

(56) References Cited

U.S. PATENT DOCUMENTS 3,550,107 A * 12/1970 Thompson ............. B23Q 15/12
340/683
4,478,538 A * 10/1984 Kakino ................. B23Q 15/12
340/683

(Continued)

FOREIGN PATENT DOCUMENTS

| JP | S56-76345 | 6/1981 |
| JP | S58-77432 | 5/1983 |

(Continued)

OTHER PUBLICATIONS

International Search Report dated Jan. 26, 2016, directed to PCT Application No. PCT/JP2015/084621, 2 pages.

*Primary Examiner* — Travis R Hunnings
(74) *Attorney, Agent, or Firm* — Morrison & Foerster LLP

(57) ABSTRACT

A machine tool is configured so that: a first frequency band comprising the main shaft characteristic vibration frequency and a second frequency band comprising the mechanical structure characteristic vibration frequency are set; thresholds are stored for each of the set frequency bands; vibration components are extracted for each of the frequency bands from the output of a vibration sensor; and when the vibration amplitude exceeds a threshold in either of the frequency bands, an alarm is sounded.

5 Claims, 2 Drawing Sheets

(51) Int. Cl.
*G05B 19/406* (2006.01)
*G01H 1/00* (2006.01)

(56) References Cited

U.S. PATENT DOCUMENTS

| | | | | |
|---|---|---|---|---|
| 4,758,964 A * | 7/1988 | Bittner | ............... | G01H 1/00 340/680 |
| 4,918,427 A * | 4/1990 | Thomas | ............... | G08B 21/187 340/680 |
| 6,114,965 A * | 9/2000 | Schoch | ............... | G01H 1/003 340/679 |
| 7,457,715 B1 * | 11/2008 | Bhateja | ............... | B24B 51/00 702/106 |
| 2005/0231350 A1 * | 10/2005 | Littrell | ............... | G01H 1/006 340/511 |
| 2012/0109360 A1 * | 5/2012 | Nishimura | ............... | B23Q 11/0032 700/180 |

FOREIGN PATENT DOCUMENTS

| | | |
|---|---|---|
| JP | 63-85413 | 4/1988 |
| JP | 4-135143 | 5/1992 |
| JP | 2001-259971 | 9/2001 |
| JP | 2008-132558 | 6/2008 |
| JP | 2012-206230 | 10/2012 |

* cited by examiner

MACHINE TOOL

CROSS REFERENCE TO RELATED APPLICATION

This application is a U.S. National phase patent application of International Patent Application No. PCT/JP2015/084821, filed Dec. 11, 2015, the contents of which are hereby incorporated by reference in the present disclosure in its entirety.

FIELD OF THE INVENTION

The present invention relates to a machine tool that makes it easier for an operator to recognize the occurrence of abnormal vibrations in a processing machine.

BACKGROUND OF THE INVENTION

Patent Literature 1 describes an abnormality detection method for detecting abnormalities during cutting from vibration data occurring during cutting. In the invention of Patent Literature 1, to detect abnormalities, vibration data occurring during cutting is acquired, amplitude data is calculated based on the vibration data, the amplitude data is subjected to a moving average process at predetermined intervals and is compared with a threshold value.

PATENT LITERATURE

[Patent Literature 1] JP-A-2008-132558

BRIEF SUMMARY OF THE INVENTION

In the invention of Patent Literature 1, the frequency of the vibrations is not considered. However, since the vibrations generated by a machine tool have various frequencies depending on the sources thereof and the amplitudes of the abnormal vibrations also differ depending on the frequency bands, by merely comparing the amplitudes of the vibrations generated by the machine tool with a threshold value, as in the invention of Patent Literature 1, it is not clear whether the vibrations are abnormal or not, and in practice, an operator may not be able to recognize the occurrence of abnormal vibrations.

The present invention aims to solve such problem of the prior art as a technical problem and aims to provide a machine tool which makes it easier for an operator to recognize the occurrence of abnormal vibrations which can lead to serious damage.

In order to achieve the above object, according to the present invention, there is provided a machine tool including a vibration sensor provided on a spindle head configured to measure vibration and detecting abnormal vibrations during machining, the machine tool comprising a frequency band setting unit configured to set, within a range of frequencies that can be measured by the vibration sensor, a first frequency band including a natural frequency of a spindle system and a second frequency band including a natural frequency of a mechanical structure system, a storage unit configured to store a threshold value for each frequency band set by the frequency band setting unit, a filter unit configured to extract vibration components in the respective frequency bands from an output from the vibration sensor, and a warning unit that issues a warning when an amplitude of vibration exceeds a threshold value in any frequency band.

According to the present invention, by setting a first frequency band including the natural frequency of the spindle system and a second frequency band including the natural frequency of the mechanical structure system, extracting the vibration components for each frequency band from the vibration sensor output, and setting different thresholds for the respective frequency bands, the detection of abnormal vibrations of a machine tool becomes easy and clear.

DETAILED DESCRIPTION OF THE INVENTION

A preferable embodiment of the present invention will be described below with reference to the attached drawings.

Figure 1:
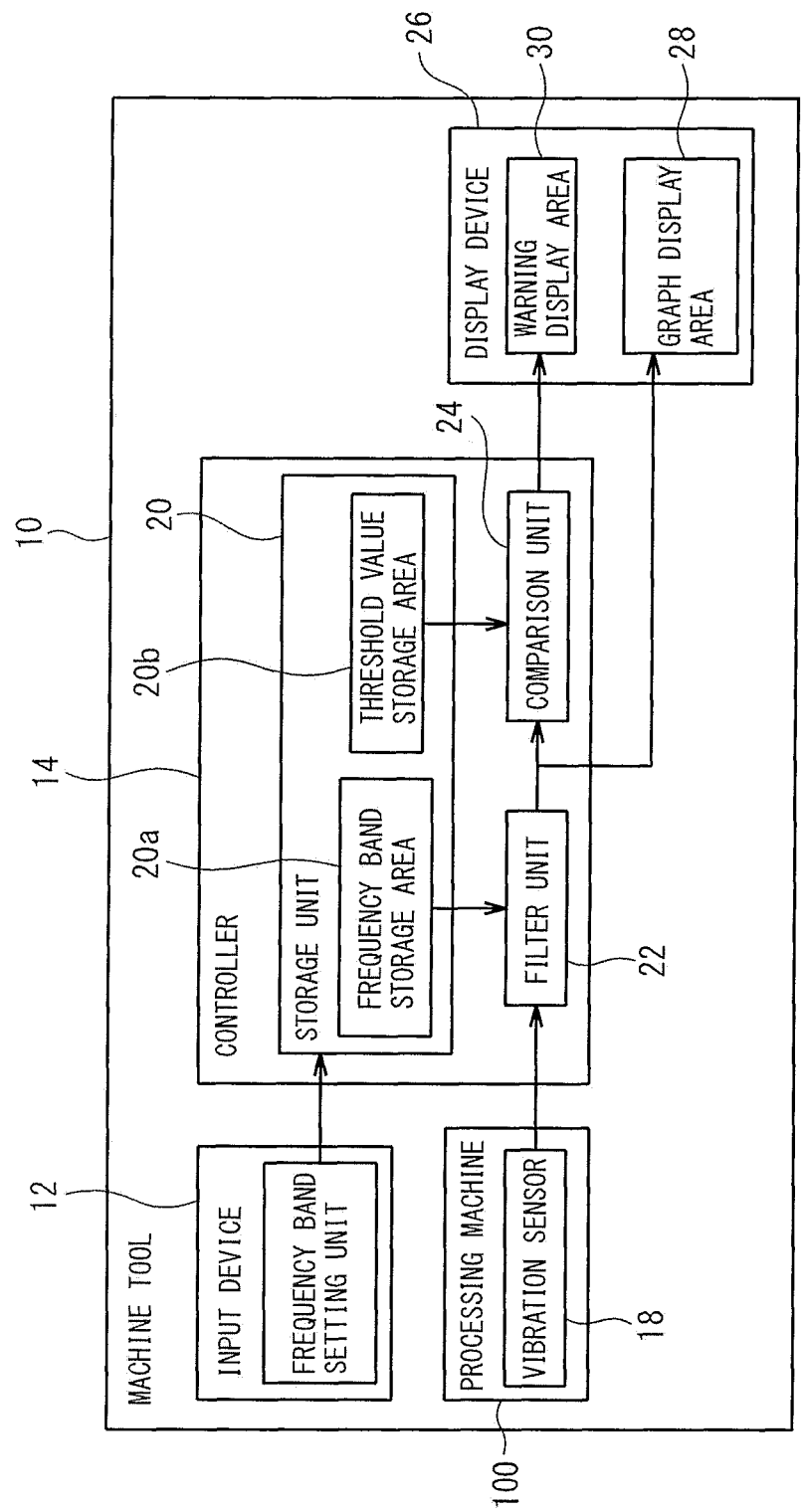
FIG. 1 is a block diagram showing a preferable embodiment of the present invention.
Figure 2:
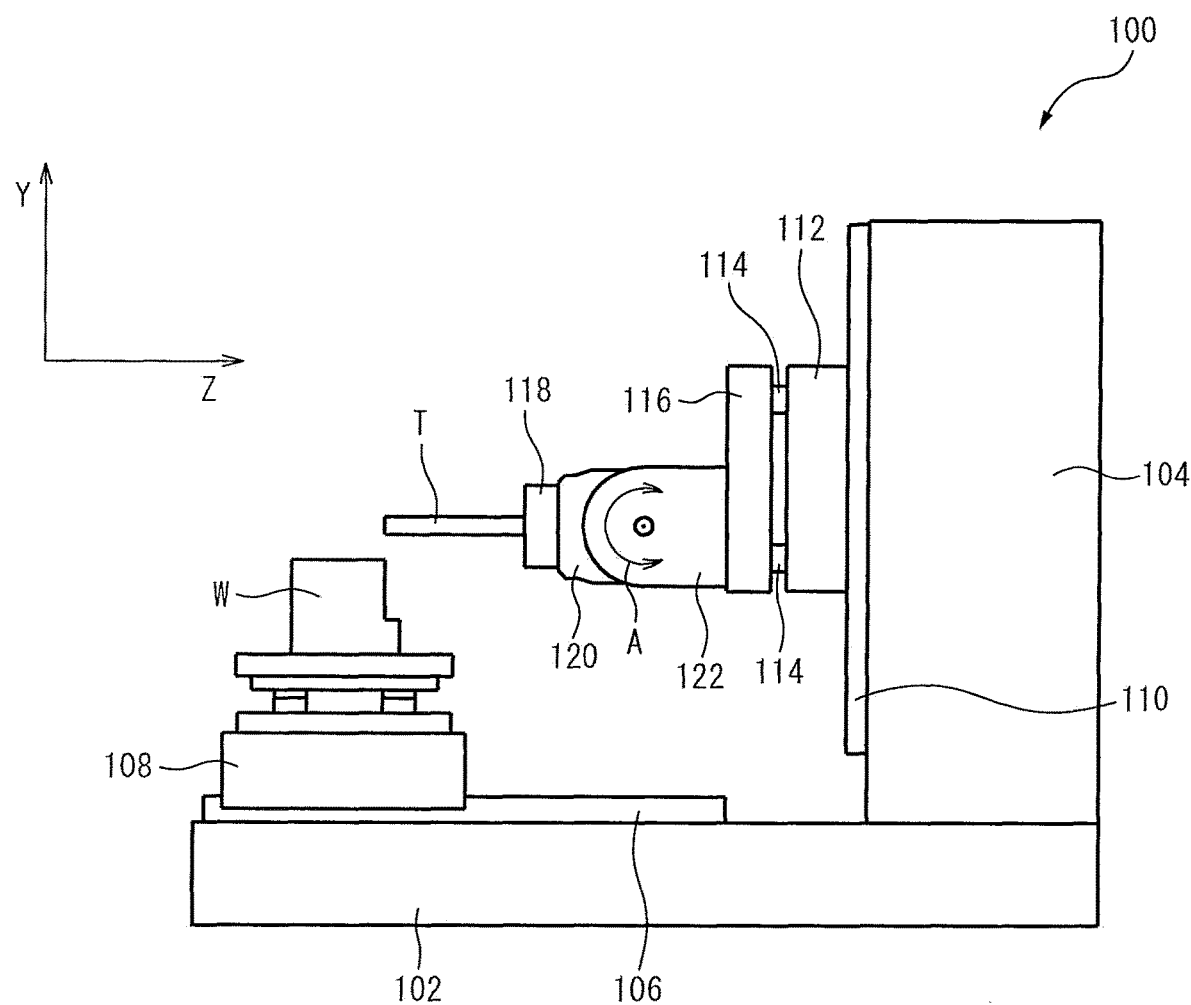
FIG. 2 is a side view showing an example of a processing machine to which the present invention is applied.

FIG. 2 shows an example of a processing machine to which the present invention is applied. In FIG. 2, a processing machine 100 according to a preferred embodiment of the present invention constitutes a horizontal milling machine and includes a bed 102 as a base fixed to the floor of a factory, a table 108 which is provided on the upper surface of the front portion (the left side in FIG. 2) of the bed 102 so as to be movable in the forward and backward directions or the Z-axis direction (the left and right directions in FIG. 1) and to which a workpiece is attached, a column 104 standing on and fixed to the upper surface of the bed 102 on the rear end side (the right side in FIG. 2) of the bed 102, a Y slider 112 mounted on the front surface of the column 104 so as to be movable in the vertical directions or the Y-axis direction, an X slider 116 mounted on the front surface of the Y slider 112 so as to be movable in the horizontal directions or the X-axis direction (the direction perpendicular to the sheet of FIG. 1), and a spindle head 120 mounted on the front of the X slider 116 to rotatably support a spindle 118.

The table 108 is provided so as to be capable of reciprocating along a pair of Z-axis guide rails 106 extending in the horizontal Z-axis direction (the right and left directions in FIG. 1) on the upper surface of the bed 102. As the Z-axis feed device configured to reciprocally drive the table 108 along the Z-axis guide rails, a ball screw (not shown) extending in the Z-axis direction and a Z-axis servo motor (not shown) connected to one end of the ball screw are provided on the bed 102. A nut (not shown) which engages with the ball screw is attached to the table 108.

The Y slider 112 is provided so as to be capable of reciprocating along a pair of Y-axis guide rails 110 extending in the Y-axis direction on the front surface of the column 104. As the Y-axis feed device configured to reciprocally drive the Y slider 112 along the Y-axis guide rails, a ball screw (not shown) extending in the Y-axis direction and a Y-axis servo motor (not shown) connected to one end of the ball screw are provided on the column 104. A nut (not shown) which engages with the ball screw is attached to the Y slider 112.

The X slider 116 is provided so as to be capable of reciprocating along a pair of X-axis guide rails 114 extending in the X-axis direction (the direction perpendicular to the sheet of FIG. 2) on the front surface of the Y slider. As the X-axis feed device unit configured to reciprocally drive the X slider 116 along the X-axis guide rails 114, a ball screw (not shown) extending in the X-axis direction and a servo motor (not shown) connected to one end of the ball screw are provided on the Y slider 112. A nut (not shown) which engages with the ball screw is attached to the X slider 116.

The spindle head 120 is attached to the X slider 116 so as to be rotationally feedable in the A-axis direction, which is a rotational feed axis centered around a horizontal axis parallel to the X-axis, by a pair of brackets 122 fixed to the front surface of the X slider 116.

In FIG. 1, the machine tool 10 according to the preferred embodiment of the present invention may include, as main constituent elements, a processing machine 100 as shown in FIG. 2, an input device 12, a controller 14 for the processing machine 100, a vibration sensor 18 attached to the processing machine 100, and a display device 26 provided in the control panel of the processing machine 100.

The input device 12 may be a keyboard or touch panel attached to the control panel of the processing machine 100 or may be a terminal (not shown) such as a personal computer connected with the controller 14 via a computer network (not shown) such as a LAN. Frequency bands 14a and threshold values 14b are input from the input device 12 to the storage unit 20 as described later. The input device 12 is configured as a frequency band setting unit which sets the frequency bands for the controller 14.

The controller 14 may be composed of a mechanical device that performs overall control of the processing machine 100, such as starting and stopping of the machining process of the processing machine 100, changing tools, changing pallets, measuring workpieces which have been machined, etc., and may include a storage unit 20, a filter unit 22, and a comparison unit 24. The storage unit 20 may be formed from a memory device or a hard drive device and may include a frequency band storage area 20a and a threshold value storage area 20b which store the frequency bands and threshold values input from the input device 12, respectively.

The vibration sensor 18 may be, for example, an acceleration sensor. Further, the vibration sensor 18 may be attached to the spindle head 118 of the processing machine 100. The component to which the vibration sensor 18 is attached is not limited to the spindle head 118 but may be the column 104 or a tool T. The filter unit 22 includes a bandpass filter which allows, from among the signals output by the vibration sensor 18, only signals representing vibrations in predetermined frequency bands to pass through to the comparison unit 24. The filter unit 22 preferably includes a programmable variable bandpass filter in which at least two frequency bands which can pass therethrough can be set, based on the at least two frequency bands stored in the frequency band storage area 20a of the storage unit 20.

The display device 26 may be formed from a liquid crystal panel or a touch panel included in the control panel of the processing machine 100 and may include a graph display area 28 and a warning display area 30. The graph display area 28 displays, based on the signal from the vibration sensor 18 that has been separated or filtered into at least two frequency bands in the filter unit 22, the amplitude or vibrational intensity of the vibrations in each frequency band as a graph, such as a bar graph. Instead of merely displaying the vibration amplitude or the vibrational intensity, the display device 26 may display the graph in proportion to the threshold values in each frequency band stored in the threshold value storage area 20b of the storage unit 20. The display device 26 further displays, on the warning display area 30, if abnormal vibrations are generated in the processing machine 100 based on a comparison result made by the comparison unit 24, thus warning the user.

The frequency bands input from the input device 12 may include a first frequency band including the natural frequency of the spindle system and a second frequency band including the natural frequency of the mechanical structure system. The natural frequency of the spindle system varies depending on the spindle 118, the shape, dimensions, and weight of the tool T mounted on the spindle 118, and the supporting structure of the spindle 118 in the spindle head 120 and is set to 1532 Hz in the example of Table 1. The natural frequency of the mechanical structure system varies depending on the shape, dimensions, weight, etc., of the ball screws of the X-axis, Y-axis, and Z-axis feed axis devices and of the bed 102 and the column 104, which are the fixed parts of the ball screws and is set to 30 Hz in the example of Table 1. The upper limit of the first frequency band may be appropriately selected as a value higher than the natural frequency of the spindle system and is set to 2000 Hz in the example of Table 1. The lower limit of the second frequency band may be appropriately selected as a value lower than the natural frequency of the natural frequency of the mechanical structure system and is set to 10 Hz in the example of Table 1.

The value of the frequency serving as a reference for setting the frequency bands may be determined by actually measuring the machine tool. When the machine tool is stopped, the tool T is hit with a hammer or the like and the natural frequency of the spindle system appears as the peak frequency when frequency analysis is performed on the output obtained from the vibration sensor 18. In the machine tool of the present embodiment, the natural frequency of the spindle system was 1532 Hz. Likewise, when the machine tool is stopped, the column is hit with a hammer or the like, and the natural frequency of the column appears as the peak frequency (35 Hz in the present embodiment) when frequency analysis is performed on the output obtained from the vibration sensor 18. Table 1 shows an example in which the natural frequency 35 Hz of the column is defined as the natural frequency of the mechanical structure system.

The lower limit of the first frequency band is a value equal to the upper limit of the second frequency band and may be the average of the natural frequency of the spindle system and the natural frequency of the mechanical structure system. In the example of Table 1, the lower limit of the first frequency band and the upper limit of the second frequency band were set to 214 Hz which was rounded from 214.383, the value of 102.33119, based on the average value 2.33119 of the common logarithmic values 3.185259 and 1.477121 of the natural frequency of the spindle system 1532 Hz and the natural frequency of the spindle structure system 30 Hz, respectively. In the example of Table 1, the common logarithms have been used, but natural logarithms may be used.

TABLE 1

|  | Second Frequency Band | | | First Frequency Band | | |
| --- | --- | --- | --- | --- | --- | --- |
|  | Lower Limit | Mechanical Structure System Natural Frequency | Upper Limit | Lower Limit | Spindle System Natural Frequency | Upper Limit |
| Hz | 10 | 30 | 214 | 214 | 1532 | 2000 |
| log10 |  | 1.477121 |  |  | 3.185259 |  |
| Ave (log10) |  |  | 2.33119 |  |  |  |
| log10→Hz |  |  | 214.383 |  |  |  |

Furthermore, in the example of Table 1, the second frequency band includes the natural frequency of the mechanical structure system. However, the second frequency band may be further divided into a low frequency band including the natural frequency of the mechanical structure system and a middle frequency band including the natural frequency of the movement system and the first frequency band may be set as a high frequency band, as shown in Table 2. In the example of Table 2, the low frequency band includes the natural frequencies of the bed and the column forming the mechanical structure system and the middle frequency band includes the natural frequencies of the spindle head 120 and the X slider 116 forming the movement system.

More specifically, in the Example of Table 2, the middle frequency band was set to the peak frequency 145 Hz, which was determined by hitting the spindle head with a hammer or the like when the machine tool was stopped and performing frequency analysis on the output obtained from the vibration sensor 18. In addition to the natural frequency 145 Hz of the movement system of the middle frequency band, the natural frequency of the spindle system of the high frequency band was set to 1532 Hz as in the example of Table 1 and the natural frequency of the low frequency mechanical structure system was set to the natural frequency 35 Hz of the column. In the example of Table 2, the upper limit of the first frequency band is 2000 Hz and the lower limit of the low frequency band is 10 Hz as a range in which the frequencies of 35 to 1352 Hz can be measured.

The lower limit of the high frequency band is a value equal to the upper limit of the middle frequency band and may be the average of the natural frequency of the spindle system and the natural frequency of the movement system. In the example of Table 2, the lower limit of the high frequency band and the upper limit of the middle frequency band were set to 471 Hz which was rounded from 471.3173029, the value of 10^2.673313384, based on the average value 2.673313384 of the common logarithmic values 3.185259 and 2.161368 of the natural frequency of the spindle system 1532 Hz and the natural frequency of the movement system 145 Hz, respectively.

The lower limit of the middle frequency band is a value equal to the upper limit of the low frequency band and may be the average of the natural frequency of the movement system and the natural frequency of the mechanical structure system. In the example of Table 2, the lower limit of the middle frequency band and the upper limit of the low frequency band were set to 66 Hz which was rounded from 65.95452979, the value of 10^1.819244628, based on the average value 1.819244628 of the common logarithmic values 2.161368 and 1.477121 of the natural frequency of the movement system 145 Hz and the natural frequency of the mechanical structure system 30 Hz, respectively.

TABLE 2

|  | Second Frequency Band | | | | | | First Frequency Band | | |
| --- | --- | --- | --- | --- | --- | --- | --- | --- | --- |
|  | Low Frequency Band | | | Middle Frequency Band | | | High Frequency Band | | |
|  | Lower Limit | Set | Upper Limit | Lower Limit | Set | Upper Limit | Lower Limit | Set | Upper Limit |
| Hz | 10 | 30 | 66 | 66 | 145 | 471 | 471 | 1532 | 2000 |
| log10 |  | 1.477121 |  |  | 2.16368 |  |  | 3.185259 |  |
| Ave (log10) |  |  | 1.819244628 |  |  | 2.673313384 |  |  |  |
| log10→Hz |  |  | 65.95452979 |  |  | 471.3173029 |  |  |  |

In the present invention, the filter unit 22 divides the signal from the vibration sensor 18 for each of the frequency bands based on the plurality of frequency bands stored in the frequency band storage area 20a. The amplitude of vibration or vibrational intensity of each of the frequency bands is displayed as a graph on the graphic display area 28 based on the signal which has passed through the filter unit 22. Furthermore, the signals divided for each frequency band in the filter unit 22 are transmitted to the comparison unit 24. The comparison unit 24 compares the threshold values input to the storage unit 20 from the input device 12 and the amplitude or vibrational intensity represented by the signal received from the filter unit 22 for each frequency band. If it is detected in the comparison unit 24 that the amplitude or vibrational intensity exceeds the threshold value, a warning is displayed on the warning display area 30 of the display device 26.

For example, if it is detected that the amplitude or vibrational intensity in the high frequency band exceeds the threshold value, it is displayed on the warning display area 30 that an abnormality has occurred in the spindle system, i.e., the spindle 118 or the tool T. If it is detected that the amplitude or vibrational intensity in the middle frequency band exceeds the threshold value, it is displayed on the warning display area 30 that an abnormality has occurred in the movement system, i.e., the spindle head 120, the A-axis rotational feed axis device, the X slider 116 or the X-axis feed axis device. If it is detected that the amplitude or vibrational intensity in the low frequency band exceeds the threshold value, it is displayed on the warning display area 30 that an abnormality has occurred in the mechanical structure system, i.e., the bed 102, the column 104, the Z-axis feed axis device, which is mounted on the bed 102, or the Y-axis feed axis device, which is mounted on the column 104.

suspected that improper installation of the tool T or a breakage of the bearing supporting the spindle, etc., has occurred.

In the case of a machine tool in which vibrations inherent to the rotation speed of the spindle are likely to occur, the natural frequency of the movement system, which was set as the frequency of the medium frequency band in Table 2, is set as the low frequency, and the frequency of the rotation speed of the spindle is set as a new middle frequency band, as shown in Table 3. In the example of Table 3, for a machine tool in which the rotation speed of the spindle was variable between 15,000 rpm and 33,000 rpm, the natural frequency of the movement system was 145 Hz, which is the same as in Table 2.

TABLE 3

| | Second Frequency Band | | | | | | First Frequency Band | | |
|---|---|---|---|---|---|---|---|---|---|
| | Low Frequency Band | | | Spindle Rotation Frequency Band | | | High Frequency Band | | |
| | Lower Limit | Set | Upper Limit | Lower Limit | Set | Upper Limit | Lower Limit | Set | Upper Limit |
| Hz | 10 | 145 | 190 | 190 | 250  550 | 663 | 663 | 800 | 2000 |
| log10 | | 2.161368 | | | 2.39794  2.740363 | | | 2.90309 | |
| Ave (log10) | | | | 2.279654005 | | | 2.821726338 | | |
| log10→Hz | | | | 190.3943276 | | | 663.3249581 | | |

Furthermore, in the present embodiment, different threshold values 14b for the at least two frequency bands thus set may be input from the input device 12 and stored in the threshold value storage area 20b of the storage unit 20. Alternatively, a low threshold value or a warning threshold value and a high threshold value or an alarm threshold value may be set for each of the at least two frequency bands. When the signal (amplitude) from the vibration sensor 18 is lower than the low threshold value or the warning threshold value, it is determined that the processing machine 100 is operating normally and green is displayed on the graphic display area 28 of the display device 28. When the signal (amplitude) from the vibration sensor 18 is higher than the low threshold value or the warning threshold value and lower than the high threshold value or the alarm threshold value, it is determined that there is a possibility that there is a transition to a state in which the processing machine 100 may become severely damaged and yellow or orange is displayed on the graphic display area 28 of the display device 26. When the signal (amplitude) from the vibration sensor 18 is higher than the high threshold value or the alarm threshold value, it is determined that vibrations causing severe damage to the processing machine 100 have occurred and red is displayed on the graphic display area 28 of the display device 26 and the processing machine 100 may be stopped.

As a second embodiment, the natural frequency of the mechanical structure includes a vibration inherent to the rotation speed of the spindle. The vibration inherent to the rotation speed of the spindle is a value obtained by converting the rotation speed of the spindle into a frequency. When the spindle rotates at 15,000 rpm, the frequency is 250 Hz. When the spindle rotates at 33,000 rpm, the frequency is 550 Hz. When the balance of spindle is insufficient and the deviation between the center of gravity of the spindle and the center of rotation is large, the amplitude increases with the frequency of the spindle rotation speed. When the frequency in the frequency band of the rotation speed is large, it can be

REFERENCE SIGNS LIST

10 Machine Tool
12 Input Device
14 Controller
18 Vibration Sensor
20 Storage Unit
20 Controller
20a Frequency Band Storage Area
20b Threshold Value Storage Area
22 Filter Unit
24 Comparison Unit
26 Display Device
28 Graph Display Area
30 Warning Display Area
100 Processing Machine
102 Bed
104 Column
106 Z-axis Guide Rail
108 Table
110 Y-axis Guide Rail
112 Y Slider
114 X-axis Guide Rail
116 X Slider
118 Spindle Head
118 Spindle
120 Spindle Head
122 Bracket

The invention claimed is:
1. A machine tool including a vibration sensor configured to measure vibration and detecting abnormal vibrations during machining, the machine tool comprising:
a frequency band setting unit configured to set, within a range of frequencies that can be measured by the vibration sensor, a first frequency band including a natural frequency of a spindle system, and a second frequency band including a natural frequency of a movement system, and a third frequency band including a natural frequency of a fixed system of a feed axis device, and a filter unit configured to extract vibration components in the first, second and third frequency bands from an output from the vibration sensor.

2. The machine tool of claim 1, further including a storage unit configured to store a threshold value for each frequency band set by the frequency band setting unit, and a warning unit that issues a warning when an amplitude of vibration exceeds a threshold value in any frequency band.

3. The machine tool of claim 2, wherein the storage unit stores a plurality of different threshold values for each frequency band, and the warning unit issues a different warning for each of the plurality of different threshold values.

4. The machine tool of claim 1, further comprising a display unit configured to graphically display amplitudes of vibrations measured by the vibration sensor in each frequency band.

5. A machine tool including a vibration sensor configured to measure vibration and detecting abnormal vibrations during machining, the machine tool comprising:

a frequency band setting unit configured to set, within a range of frequencies that can be measured by the vibration sensor, a first frequency band including a natural frequency of a spindle system, a second frequency band including a natural frequency of a movement system, and a third frequency band including a natural frequency of a spindle rotation, and a filter unit configured to extract vibration components in the first, second and third frequency bands from an output from the vibration sensor.

* * * * *